INVENTOR
GABRIEL L. GUINOT
BY
Mason Fenwick & Lawrence
ATTORNEYS

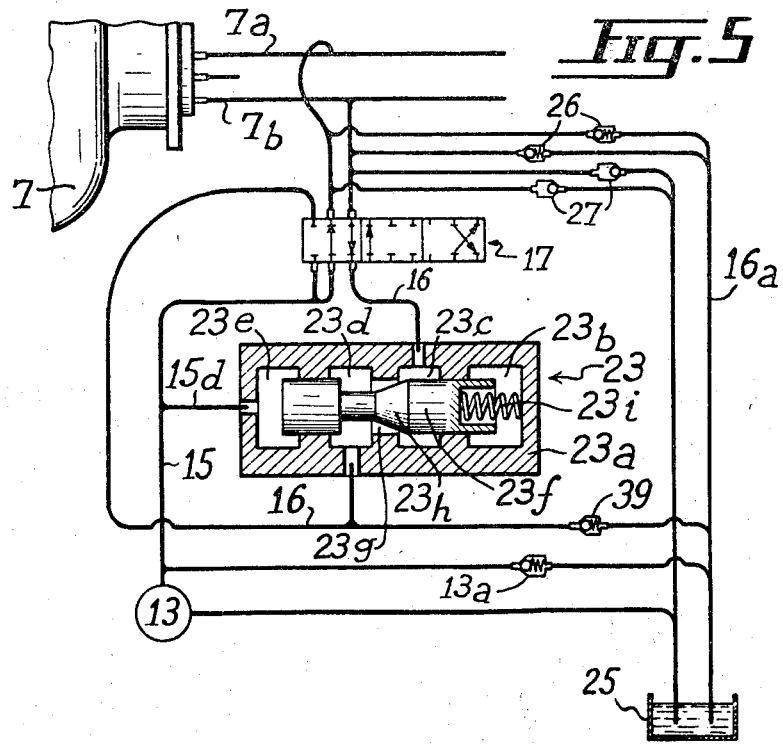
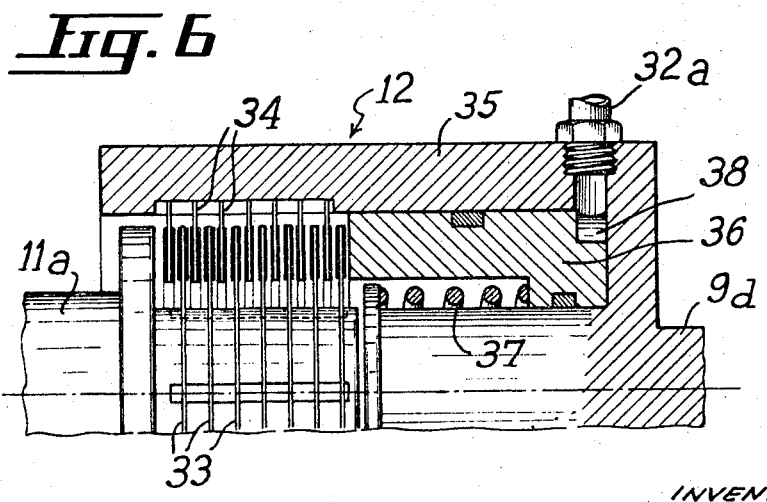
INVENTOR
GABRIEL L. GUINOT
BY
Mason Fenwick & Lawrence
ATTORNEYS United States Patent Office 3,422,917
Patented Jan. 21, 1969

3,422,917
HYDRAULIC POWER TRANSMISSION FOR VEHICLES
Gabriel L. Guinot, Le Plessis-Belleville, France, assignor to Societe Anonyme Poclain, Le Plessis-Belleville, Oise, France, a French society
Filed Aug. 22, 1966, Ser. No. 574,036
Claims priority, application France, Oct. 13, 1965, 34,753
U.S. Cl. 180—66     5 Claims
Int. Cl. B60k 3/00, 7/00

ABSTRACT OF THE DISCLOSURE

A vehicle having an hydraulic transmission and comprising at least two wheel axles with wheels mounted thereon. An hydraulic motor associated with each of the wheels, two hydraulic pumps adapted to be driven by a heat engine and a distribution selector for selectively connecting the pumps with the motors. The hydraulic pumps being permanently coupled to the heat engine and means whereby the delivery of pressurized fluid by the pumps to the motors is dependent upon the load applied to the axles. Clutch means controlled by the distribution selector disposed between the motors of the axle taking the maximum load and the corresponding vehicle wheels.

---

Figure 1:
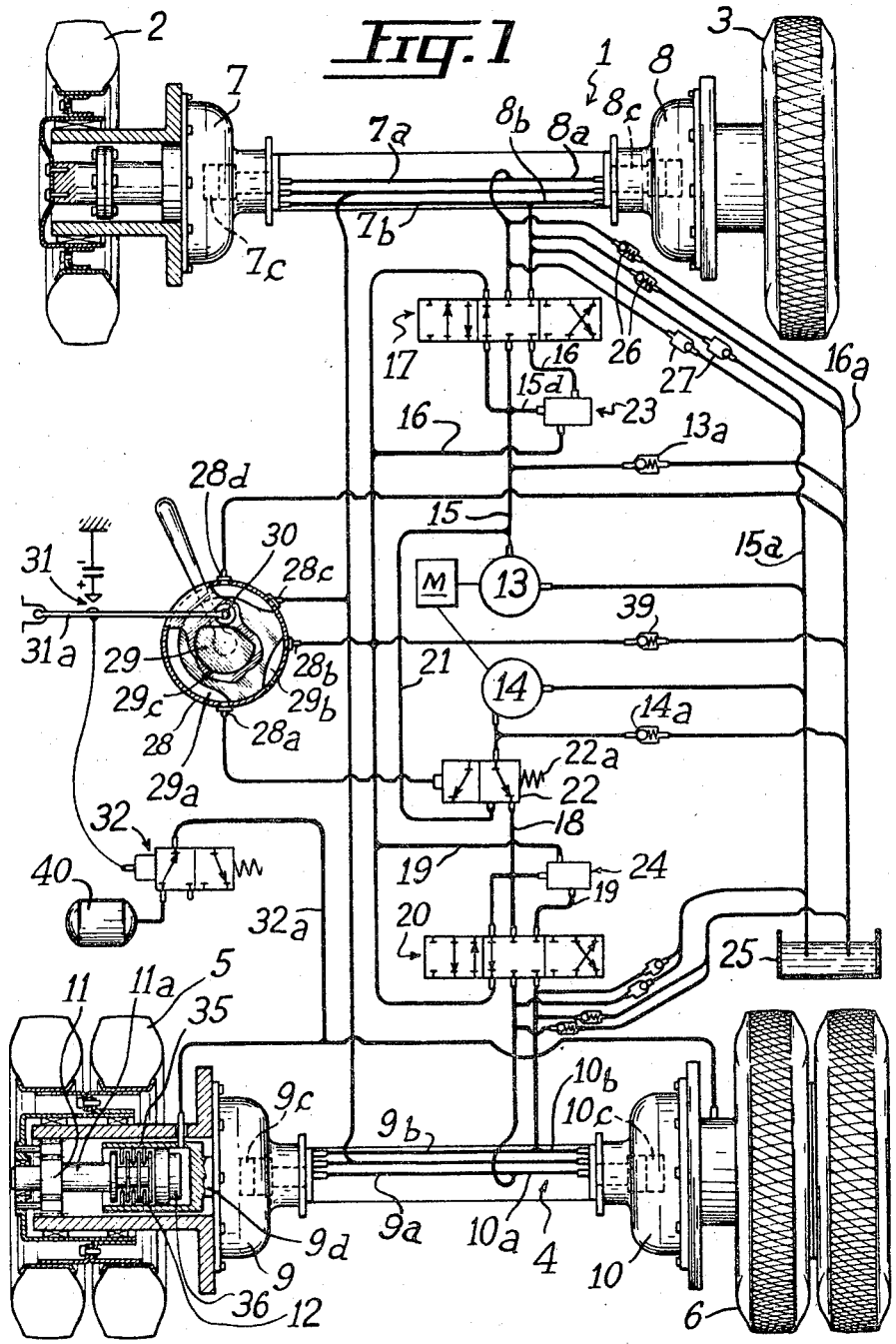

This invention relates to an hydraulic power transmission for vehicles.

On some vehicles, more particularly public works or mechanical handling vehicles and equipment, it is of course advantageous for all the wheels to be driven, so that the vehicle may have total adhesion. Hydraulic motors which are designed to deliver a high torque at a very low speed have already been used for this purpose but on a vehicle equipped in this way it is also advantageous to provide for flexible speed changes for the vehicle travel and to supplement the conventional braking means by means of the hydraulic motors used in the transmission.

In a known form of hydraulic transmission (see U.S. Patent 3,092,970) the front and rear wheels of the vehicle are coupled to hydraulic motors having different cubic capacities. These motors are fed separately or collectively by one or two pumps having different rates of delivery, the said pumps being connected to a heat engine:

With this type of vehicle, however, the two pumps are not always driven by the heat engine and although the hydraulic motors are always connected to the wheels they do not always receive pressure fluid.

It would be advantageous for the heat engine to operate at a constant loading to deliver a constant rate of flow of pressure fluid through the agency of the hydraulic pumps.

Also, when some motors are driven by the wheels instead of being fed they act as a pump and an appreciable power is unnecessarily expended on the other motors. This loss of driving power increases with increasing cubic capacity of the motors and when the motors are coupled to the wheels through the agency of a reduction gear.

The object of the present invention is to obviate these disadvantages and to provide an hydraulic transmission for a vehicle which satisfies the above conditions and which also provides other advantages as hereinafter explained.

The transmission according to the invention comprises two hydraulic pumps adapted to be driven by a heat engine disposed on a chassis having at least two axles, and a hydraulic motor associated with each vehicle wheel, a distribution selector whereby one and/or other of the pumps can be associated with the motors of one and/or other axle, the two hydraulic pumps being permanently coupled to the heat engine and their respective rates of flow being established according to the loads taken by the axles respectively, a clutch controlled by the distribution selector being disposed between the motors of one of the axles and the corresponding wheels.

The invention will be more readily understood and other features and advantages will be apparent from the following description of one particular embodiment thereof as applied, to a twin-axled four wheel vehicle, each wheel being driven by a known type of hydraulic motor having two different preset cubic capacity values which can be chosen selectively.

Motors of the type have already been disclosed and described in detail, more particularly in U.S. Patent No. 3,286,937 and application for U.S. patent, Ser. No. 459,864 filed on May 28, 1965 by the same applicants.

In the example to be described hereinafter, the ratio of the two cubic capacities which can be used in any one motor is 2:1.

Of course, this is not intended as a limiting factor and the invention can be applied to other types of vehicle equipped with motors having cubic capacities which can be varied in one or more ratios.

Figure 2:
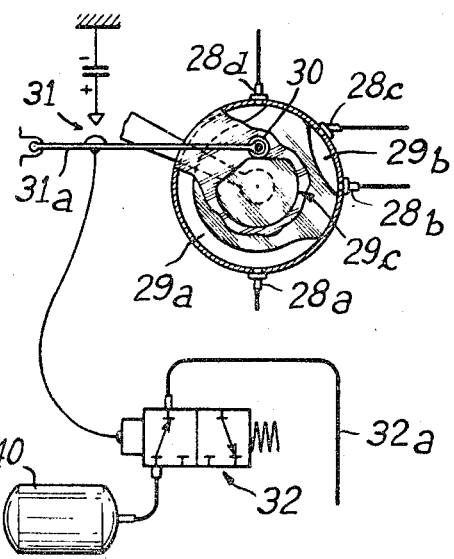
Figure 3:
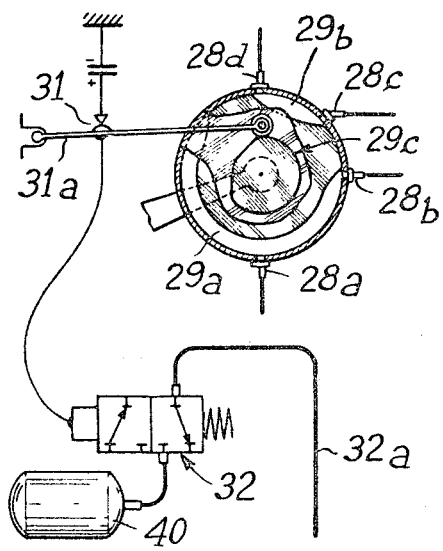
Figure 4:
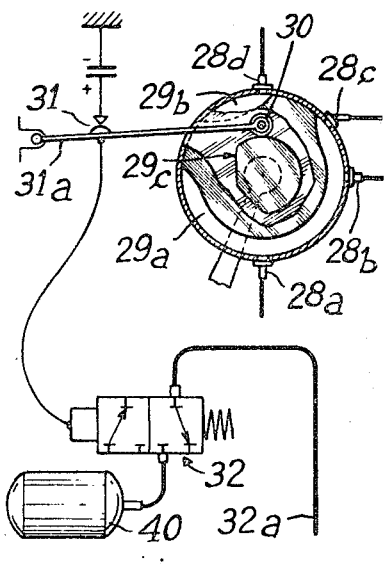

In the accompanying drawings:
FIGURE 1 is a general schematic diagram of the hydraulic circuit of a vehicle equipped with a transmission according to the invention, showing a speed change control element in one position;
FIGURE 2 is a detail showing the speed change control element in a second position;
FIGURE 3 is a detail showing the speed change control element in a third position;
FIGURE 4 is a detail showing the speed change control element in a fourth position;
FIGURE 5 is a detail of the speed limiter for a motor for the vehicle shown in FIGURE 1; and
FIGURE 6 is a section showing part of a clutch provided in the rear motors of a vehicle shown in FIGURE 1.

Referring to FIGURE 1 of these drawings the vehicle comprises a front axle 1 equipped with two steering front wheels 2 and 3, and a back axle 4 equipped with four back wheels arranged in pairs at 5 and 6.

The four wheels can be driven by separate hydraulic motors 7, 8 at the front and 9, 10 at the rear, which are identical but have two different cubic capacities. Each motor is provided with a cubic capacity selector 7c, 8c and 9c, 10c which enables either cubic capacity to be used as required. A detailed description of the motors and cubic capacity selectors is given in the specifications of the aforesaid U.S. Patent and application. It will not be repeated here but by way of example it may be stated that the ratio of the cubic capacities is 2:1.

It will also be assumed that the back axle 4 is required to withstand three times the loading of the front axle 1 and hence to take full advantage of the adhesion the back motors 9 and 10 must produce a torque three times greater than that of the front motors 7 and 8. This is obtained by a known technique through the agency of a reduction gear interposed between a wheel and the corresponding motor. A reduction gear of this type is shown in section at wheel 5, with a reduction ratio of 3:1 and is indicated generally at 11.

A multidisc clutch indicated generally at 12 is also disposed between the reduction gear 11 and the motor 9. A description and the purpose of this clutch will be hereinafter described. Of course the wheel 6 is equipped in the same way at the wheel 5.

To obtain identical speeds of rotation, the effect of the reduction gears, e.g. 11, must be compensated for by driving the motors 9, 10 at a faster speed. A description of how this compensation is achieved will be hereinafter described.

A first feed pump 13 with an associated safety valve 13a is provided for the front motors 7 and 8 and delivers to a conduit 15 and a three-position distributor 17 which provides stoppage of the feed; forward travel or reverse travel. The motors 7 and 8 are connected to the distributor 17 through two conduits 7a, 7b on the one hand and 8a, 8b on the other hand, which can be respectively and selectively brought into communication with the feed conduit 15 and with the return conduit 16 connected to the reservoir 25 through a relief valve 39, the preset pressure of which is low relative to the delivery pressure of the pump 13, for example of the order of 10 kg./cm.$^2$ if the pump pressure is about 300 kg./cm.$^2$.

Similarly, a second pump 14 associated with a safety valve 14a and having a delivery three times that of the pump 13 in this example, feeds the rear motors 9 and 10 through a main conduit 18 and a distributor/reverser 20, the said motors being connected in parallel by means of conduits 9a, 9b and 10a, 10b respectively, the return conduit 19 also being connected to the reservoir 25 through the agency of the preset valve 39, both pumps 13 and 14 are permanently connected to a heat engine M so as to be continuously driven by this engine when the engine is operating.

The main feed conduits 15 and 18 are also interconnected through a conduit 21 and by a two-position distributor 22 which in one position provides direct communication between the pump 14 and the conduit 18, the conduit 21 being isolated, while in the other position it provides direct communication between the pump 14 and the conduit 21 while isolating the conduit 18 and hence the rear motors 9 and 10.

Identical speed limiters indicated generally at 23 and 24, and the construction and purpose of which will be explained with reference to FIGURE 5, are provided down-stream of each of the distributors 17 and 20 in the return conduits 16 and 19. The circuit shown to a smaller scale in FIGURE 5 illustrates only some of the elements in FIGURE 1, and these have been given the same reference numerals. Motor 7 is connected to pump 13 and to reservoir 25 through conduits 15 and 16 containing the distributor 17 which enables the supply to the motor to be established, discontinued or reversed.

The speed limiter 23 comprises a body 23a with four inner chambers 23b, 23c, 23d, 23e bounded by apertures in which a piston 23f is mounted to be slidable. The central aperture 23g between the chambers 23c, 23d has a diameter equal at maximum to that of the piston 23f which has a frustoconical part 23h or, more generally, a zone of developing section in register with the aperture. This system provides a variable-section passage which is normally closed in the absence of any fluid pressure in the chamber 23e under the effect of a spring 23i disposed in the chamber 23b and urging the piston 23f to close the opening 23g. The chamber 23e is connected via a duct 15d to the main conduit 15. The return conduit 16 leads into chamber 23c and as it leaves the chamber 23d it continues on the other side of the throttled passage 23g and leads to the reservoir 25. Non-return valves 27 are disposed in branches 15b connecting the feed conduits 7a, 7b and the reservoir 25. These valves allow fluid to flow only to the said feed conduits while preset valves 26 are provided on branches 16a connecting the reservoir 25 and the feed conduits 7a, 7b between the motor 7 and the distributor 17. Preferably, the preset pressure of the valves 26 will be in the region of the preset pressure of the safety valve 13a associated with the pump 13. The speed limiter 24 is of a similar construction to that of the above-described limiter 23 and non-return valves and preset valves similar to the valves 27 and 26 are associated with the rear motors 9 and 10.

The vehicle operates as follows: assuming that the distributors 17 and 20 are initially set to the right-hand position (FIGURE 1) corresponding, for example, to forward travel, distributor 22 being in the position shown in the drawing, the fluid delivered by the pumps 13 and 14 is fed respectively to the motors 7 and 8 on the one hand, and 9 and 10 on the other hand. The clutches 12 are in the engaged position and the difference between the deliveries of the pumps 13 and 14 is compensated for by the presence of the reduction gears 11, while the cubic capacity selectors 7c, 8c, 9c, 10c are in the position corresponding to the maximum cubic capacity of the motors. This first stage of operation corresponds to the slow speed.

A second vehicle speed is obtained by changing the cubic capacity of the motors by means of the selectors 7c, 8c, 9c, 10c, the control of which will be described hereinafter.

A third speed is obtained by simultaneously operating the distributor 22, which is set to the right-hand position against the action of a return spring 22a (FIGURE 1), the speed selectors 7c, 8c, 9c, 10c, which are set to the position corresponding to the maximum cubic capacity, and the clutches 12 which are disengaged. The elements provided for this simultaneous control will be described hereinafter. In this third stage, however, the two pumps 13 and 14 deliver to the front motors 7 and 8, the rear motors 9 and 10 being decoupled from their wheels 4 and 5. The total delivery fed to the motors 7 and 8 being four times that of the pump 13, the speed of the vehicle in this third phase will be four times greater than the speed in the first phase. Finally, actuation of the selectors 7c and 8c to bring them into the position for the smallest cubic capacity gives a fourth vehicle speed which in this example is twice the third speed and four times the second speed.

If the distributors 17 and 20 are set to the left, four reverse speeds can be obtained and with this arrangement and irrespective of the direction of travel this system provides completely independent driving torques for the front and rear wheels.

Referring more particularly to FIGURE 5, in normal operation the pump 13 feeds the motor 7 through the conduit 15 while the deliver pressure transmitted to the chamber 23e compels the piston 23f to open the passage 23g completely, the fluid return being obtained through this passage. When the motor is driven by the vehicle, for example on downhill travel, the pressure in conduit 15 and hence in chamber 23e falls and the spring 23i starts to push the piston 23f again, i.e. reduce the section of the passage 23g. The motor is braked increasingly as the driven speed increases. At the limit, the passage 23g is completely throttled and the pressure is limited by the preset valve 26 corresponding to the direction of flow of the fluid drawn from the conduit 16.

The use of a speed limiter 23 for the front motors 7, 8 and an identical system 24 for the rear motors 9, 10 therefore provides the vehicle with deceleration torques, the action of which is added to that of conventional braking means. If the preset valves 26 are given the same calibrated value as the safety valves 13a and 14a of the pumps 13 and 14, the maximum braking torque offered by a motor can be made equal to its driving torque.

At this stage it should be pointed out that the vehicle speed changes can be carried out very quickly and very flexibly and without any risk of damage to the components, even in the event of an abrupt changeover from the fourth speed to the first speed. The reason for this is that the preset valves 26 limit the braking torque to a suitable value while the non-return valves 27 prevent any negative pressure from forming in the motor feed conduits and obviate any risk of cavitation in the motors. In this connection, it should be pointed out that in the event of a breakdown of the conventional braking installation, an appreciable braking torque is available. For this purpose the distributors 17 and 20 are simply set to the neutral (central) position: the front and rear motors then operate as a pump fed by the valves 27 and deliver through the valves 26. If the valves 26 are preset to the same pressure as the valves 27, the safety braking torque is equal to the driving torque.

The means for controlling the cubic capacity selectors, clutches for the rear wheels and the distributor 22 will now be described with reference to FIGURE 1.

The control circuit consists essentially of a manually controlled distributor comprising a cylindrical casing 28 in which a pivot 29 is mounted for rotation, said pivot having two grooves 29a and 29b adapted to provide communication between two or more of the ports 28a, 28b, 28c, 28d formed in the casing 28. To this end, pivot 29 can occupy four separate positions and is also integral with a cam 29c co-operating with a cam follower 30 attached to the movable contact 31a of a microswitch 31, the other contact of which is grounded.

The movable contact 31a is electrically connected to a solenoid valve 32, the ports of which are connected respectively to a pressure fluid reservoir, for example a compressed air reservoir 40, and the control for the clutches 12 for the rear wheels 5 and 6 through a conduit 32a. These clutches 12 (FIGURE 6) are of the multi-disc type, the discs 33 being integral with the shaft 11a of the reduction gear 11 while the other discs 34 are integral with a sleeve 35 keyed on the output shaft 9d of the motor 9. The sleeve 35 protects an axially displaceable ring 36 which is urged into the inoperative, i.e. disengaged, position by means of a spring 37. At the side remote from the spring 37, the ring 36 co-operates with the sleeve 35 to bound a chamber 38 to which the conduit 32a from the solenoid valve 32 leads.

Referring again to FIGURE 1, the port 28a of the distributor 28 is connected through a duct to the distributor 22, port 28b is connected to the return conduits 16 and 19 of the motors upstream of the preset valve 39, port 28c is connected to the cubic capacity selectors 7c, 8c, 9c and 10c of the front and rear motors, while port 28d is connected directly to reservoir 25.

The first position of selector 28 is shown in FIGURE 1. The two ports 28a and 28c connected to elements which it is required to control communicate with the reservoir 25 through the groove 29a. Distributor 22 is in the position shown in FIGURE 1, while the cubic capacity selectors are in the position corresponding to the maximum cubic capacity. The clutches 12 are engaged by the pressure from the reservoir 40, the solenoid valve 32 being deenergised. The vehicle therefore moves in the first speed as indicated hereinbefore.

The second position of the selector 28 is shown in FIGURE 2. The port 28a still communicates with port 28d through grooves 29a and hence with reservoir 25 so that the pumps 13 and 14 again separately feed the front motors 7 and 8 and the rear motors 9 and 10. Port 28b communicates with port 28c via groove 29b so that the return oil pressure acts on the cubic capacity selectors 7c, 8c, 9c, 10c which occupy the small cubic capacity position, i.e. the second speed.

FIGURE 3 shows the third position of the selector 28. Port 28a communicates with port 28b through groove 29a so that the return oil pressure of the front motors acts on the distributor 22, the position of which changes, and feeds the delivery of pump 14 to the front motors through conduit 21. At the same time, cam 29c pushes cam follower 30 and the movable contact 31a of the switch 31 closed the circuit for the solenoid valve 32, which moves to the left so that the reservoir 40 is isolated and the chambers 38 of the clutches 12 communicate with atmosphere. The clutches 12 are then in the inoperative position as a result of the spring 37 and back wheels 5 and 6 are disengaged. At the same time, port 28c is brought into communication with port 28d and hence with reservoir 25 through groove 29b. The cubic capacity selectors return to the first position corresponding to maximum cubic capacity, i.e. third speed.

The fourth position of selector 28 is shown in FIGURE 4. Port 28a and port 28c communicate with port port 28b so that the distributor 22 remains in the position it occupied previously but the cubic capacity selectors 7c, 8c, 9c, 10c resume their second position corresponding to the minimum cubic capacity. Cam 29 still pushes the cam follower 30, switch 31 remains closed and the back wheels 5 and 6 still remain disengaged. This is the fourth speed.

The invention is not limited to the above-described embodiment but covers all variants thereof which could be made without departing from the scope of the invention as defined in the appended claims. More particularly, the motors with two cubic capacities could be replaced by motors adapted to have a number of graduated cubic capacity values or even a continuously variable cubic capacity. On the other hand, if a vehicle is already provided with a hydraulic circuit fed by a pump, e.g. a hydraulic shovel, the two circuits could advantageously be combined and the existing pump could be utilised to carry out the functions of one or other of the pumps feeding the front and rear motors.

I claim:

1. A vehicle having an hydraulic transmission and comprising at least two wheel axles with wheels mounted thereon; an hydraulic motor associated with each of said wheels; two hydraulic pumps adapted to be driven by a heat engine; a distribution selector for selectively connecting said pumps with all or only two of said motors; said hydraulic pumps being permanently coupled to said heat engine and means whereby the delivery of pressure fluid by said pumps is dependent upon the load on said axles; and clutch means controlled by said distribution selector disposed between the motors of the axle taking the maximum load and the corresponding vehicle wheels.

2. A vehicle having an hydraulic transmission according to claim 1, wherein the hydraulic motors are identical and the motors associated with the axle taking the maximum load are connected to the corresponding wheels through a reduction gear.

3. A vehicle having an hydraulic transmission according to claim 1, wherein the four motors have variable cubic capacities.

4. A vehicle having an hydraulic transmission according to claim 1, wherein the motors are connected to a reservoir through a return flow limiter controlled by the pressure of the fluid fed by the pumps to the motors, and a preset relief valve is disposed between the said motors and the said limiter.

5. A vehicle having an hydraulic transmission according to claim 1, wherein the motors are connected to a reservoir through a return flow limiter controlled by the pressure of the fluid fed by the pumps to the motors, a preset relief valve is disposed between the said motor and the said limiter, and a suction valve is connected in parallel with the return flow limiter between the reservoir and the motors.

References Cited

UNITED STATES PATENTS

| | | | |
|---|---|---|---|
| 3,053,043 | 9/1962 | Knowler | 180—66 XR |
| 3,092,970 | 6/1963 | Sampietro | 180—66 XR |
| 3,129,781 | 4/1964 | Stein | 180—66 XR |
| 3,161,246 | 12/1964 | Meeker et al. | 180—66 XR |
| 3,250,340 | 5/1966 | Roberson | 180—66 XR |
| 3,272,276 | 9/1966 | Budzich | 180—66 XR |
| 3,272,279 | 9/1966 | Budzich | 180—66 XR |
| 3,344,879 | 10/1967 | Glomb et al. | 180—66 XR |

BENJAMIN HERSH, *Primary Examiner.*

MILTON L. SMITH, *Assistant Examiner.*

U.S. Cl. X.R.

60—53